United States Patent
Henry et al.

(10) Patent No.: US 7,760,727 B2
(45) Date of Patent: Jul. 20, 2010

(54) SYSTEM & METHOD FOR FABRIC STORAGE UTILIZING MULTICAST WITH DISTRIBUTED INTELLIGENCE

(75) Inventors: Russell J. Henry, Wichita, KS (US); Gerald J. Fredin, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 896 days.

(21) Appl. No.: 11/167,379

(22) Filed: Jun. 27, 2005

(65) Prior Publication Data
US 2006/0291467 A1 Dec. 28, 2006

(51) Int. Cl.
*H04L 12/56* (2006.01)
(52) U.S. Cl. ........................... 370/390; 370/432
(58) Field of Classification Search ................. 370/390, 370/432
See application file for complete search history.

(56) References Cited

U.S. PATENT DOCUMENTS

| | | | | |
|---|---|---|---|---|
| 5,898,686 A * | 4/1999 | Virgile | | 370/381 |
| 7,225,317 B1 * | 5/2007 | Glade et al. | | 711/206 |
| 2002/0147978 A1 * | 10/2002 | Dolgonos et al. | | 725/62 |
| 2002/0198899 A1 * | 12/2002 | Yamaguchi et al. | | 707/200 |
| 2003/0078945 A1 * | 4/2003 | Kibuse | | 707/200 |
| 2003/0189935 A1 * | 10/2003 | Warden et al. | | 370/395.21 |
| 2004/0085347 A1 * | 5/2004 | Hagarty et al. | | 345/735 |
| 2005/0086444 A1 * | 4/2005 | Tanaka | | 711/162 |
| 2005/0257082 A1 * | 11/2005 | Zohar et al. | | 714/6 |

* cited by examiner

*Primary Examiner*—Chirag G Shah
*Assistant Examiner*—Salvador E Rivas
(74) *Attorney, Agent, or Firm*—Suiter Swantz pc llo

(57) ABSTRACT

The present invention is a system utilizing multicast with distributed intelligence including an initiator device for transmitting a request, the request being addressed to a multicast group. The system also includes a switch for receiving the request from the initiator device. The switch is configured with multicast functionality for multicasting copies of the request to the multicast group. Additionally, the system includes a plurality of multicast group devices, each configured for receiving a copy of the request from the initiator device, via the switch. Each device of the plurality of multicast group devices is further configured with mapping functionality for allowing the storage device to determine a storage layout of the multicast group device. The initiator device, switch and each device of the plurality of multicast group devices are communicatively coupled via a network.

14 Claims, 10 Drawing Sheets

SYSTEM & METHOD FOR FABRIC STORAGE UTILIZING MULTICAST WITH DISTRIBUTED INTELLIGENCE

FIELD OF THE INVENTION

The present invention relates to the field of electronic data storage and particularly to a system and method for fabric storage utilizing multicast with distributed intelligence.

BACKGROUND OF THE INVENTION

A number of current implementations of fabric storage utilize an "intelligent" switch, which accepts a storage request (i.e., read or write) from a host/server and generates other separate, specifically-tailored storage requests to associated targets (i.e., storage devices). The "intelligent" switch is able to generate the specifically-tailored requests because it contains the mapping functionality, which includes the storage layout for the storage devices. However, implementing a switch having such a level of "intelligence" slows down the rate at which requests are delivered to the intended targets.

Therefore, it would be desirable to have a method for fabric storage utilizing multicast with distributed intelligence. The intelligence (i.e., mapping functionality) may be distributed to the intended targets, thereby reducing the required switch intelligence and speeding up the delivery of the requests to the intended targets.

SUMMARY OF THE INVENTION

Accordingly, an embodiment of the present invention is directed to a system utilizing multicast with distributed intelligence including an initiator device for transmitting a request, the request being addressed to a multicast group. The system also includes a switch for receiving the request from the initiator device. The switch is configured with multicast functionality for multicasting copies of the request to the multicast group. Additionally, the system includes a plurality of multicast group devices each configured for receiving a copy of the request from the initiator device, via the switch. Each device of the plurality of multicast group devices is further configured with mapping functionality for allowing the storage device to determine a storage layout of the multicast group device. The initiator device, switch and each device of the plurality of multicast group devices are communicatively coupled via a network.

A further embodiment of the present invention is directed to a method for fabric storage utilizing multicast with distributed intelligence. The method includes the step of transmitting a request to a switch. The method further includes the step of multicasting copies of the request from the switch to a plurality of multicast group devices. Further, each device of the plurality of multicast group devices is configured with a mapping functionality for allowing the multicast group device to determine a storage layout of the multicast group device.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
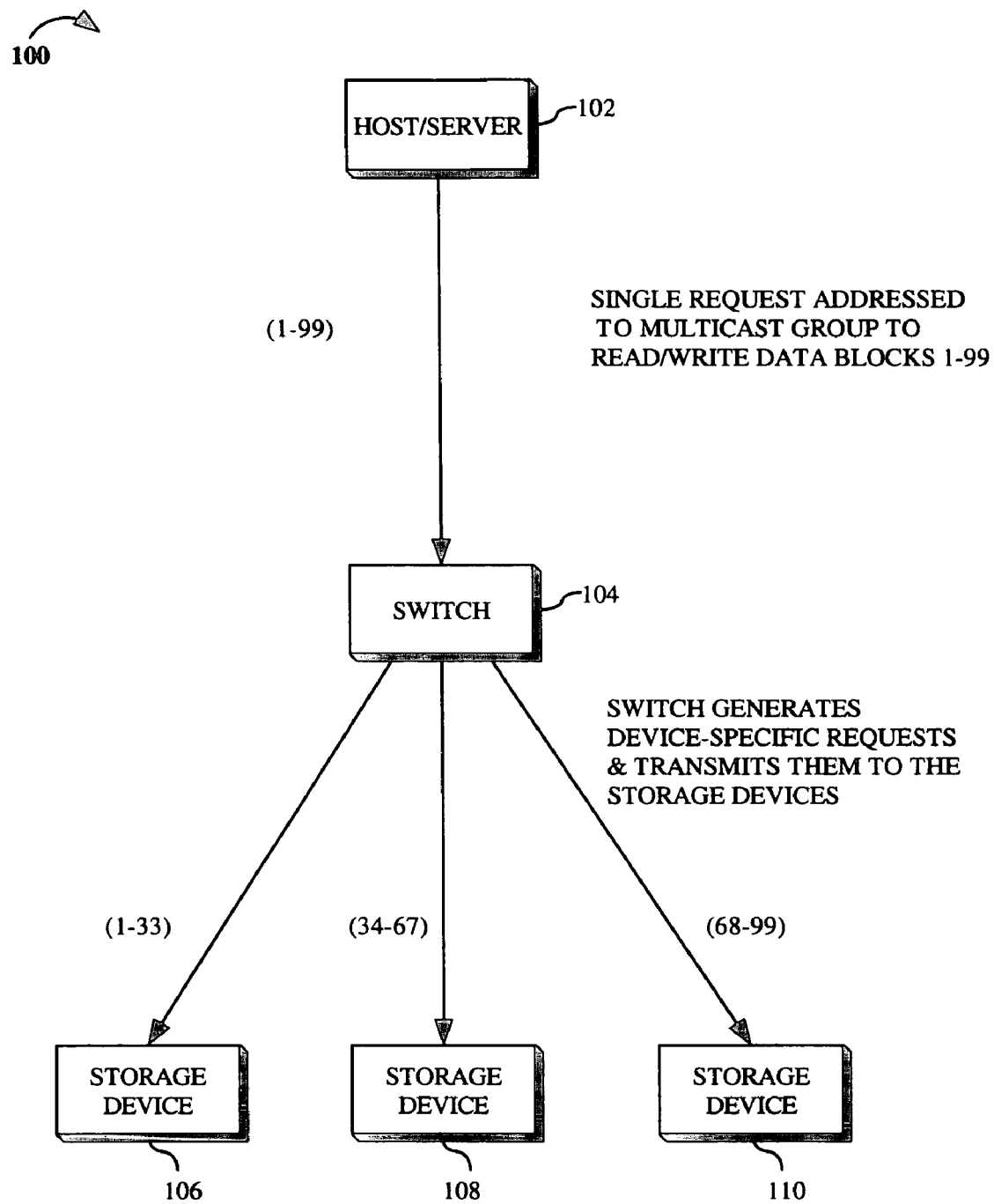
FIG. 1 is an illustration of a prior art system for fabric storage utilizing an "intelligent" switch.

FIG. 1 illustrates a typical system of fabric storage. The system 100 includes a host/server 102, a switch 104 and a plurality of storage devices (106, 108 and 110), all communicatively connected over a network, such as a Storage Area Network (SAN), or the like. In the illustrated system 100, striping is being implemented so that a number of data blocks, such as data blocks 1-99 of a host volume are stored or "striped" across the plurality of storage devices (106, 108 and 110). For instance, a first storage device 106 stores data blocks 1-33, a second storage device 108 stores data blocks 34-67, and a third storage device 110 stores data blocks 68-99.

In the typical system 100, the host/server 102 issues a request, such as a read request or a write request. For example, the host/server 102 may issue a read request asking for data blocks 1-99. The request is then received by the switch 104, which is an "intelligent" switch configured with mapping functionality. The mapping functionality provides the switch 104 with the ability to determine on which storage devices (106, 108 and 110) particular data blocks are stored. Utilizing its mapping functionality, the intelligent switch 104, upon receiving the read request from the host/server 102, generates separate, specifically-tailored read requests to the proper storage devices (106, 108 and 110) to obtain the requested data blocks. For instance, the "intelligent" switch 104 generates a first read request and sends it to the first storage device 106, specifically requesting data blocks 1-33. The intelligent switch 104 also generates and sends second and third read requests to storage devices 108 and 110 specifically asking for data blocks 34-67 and 68-99 respectively. However, when an "intelligent" switch 104 as described above is utilized, the rate of delivery of the requests to the storage devices (106, 108 and 110) may be slower than desired. This may be due to the time spent by the switch 104 processing the request received from the host/server 102 and generating separate, specifically-tailored requests for data to each storage device (106, 108 and 110). This can be especially problematic in situations when the data blocks desired by the host/server 102 are striped across a large number of storage devices. A goal of the present invention is to distribute the "intelligence" (i.e., mapping functionality) to the storage devices (106, 108 and 110), thus reducing the required switch intelligence and thereby speeding up the delivery of a host/server request to its intended targets.

Referring generally to FIGS. 2-6, a system for fabric storage utilizing multicast in accordance with exemplary embodiments of the present invention is shown. The system 200 includes an initiator device, such as a host/server 202. The system 200 further includes a switch 204, and a plurality of multicast group devices, such as storage devices (206, 208 and 210). The host/server 202, switch 204 and storage devices (206, 208 and 210) are all communicatively connected over a network, such as a Storage Area Network (SAN), or the like. In current embodiments, multicast functionality is implemented within the switch 204. It is contemplated that various methods known to those of skill in the art may be implemented to configure the switch 204 with multicast functionality.

Figure 2:
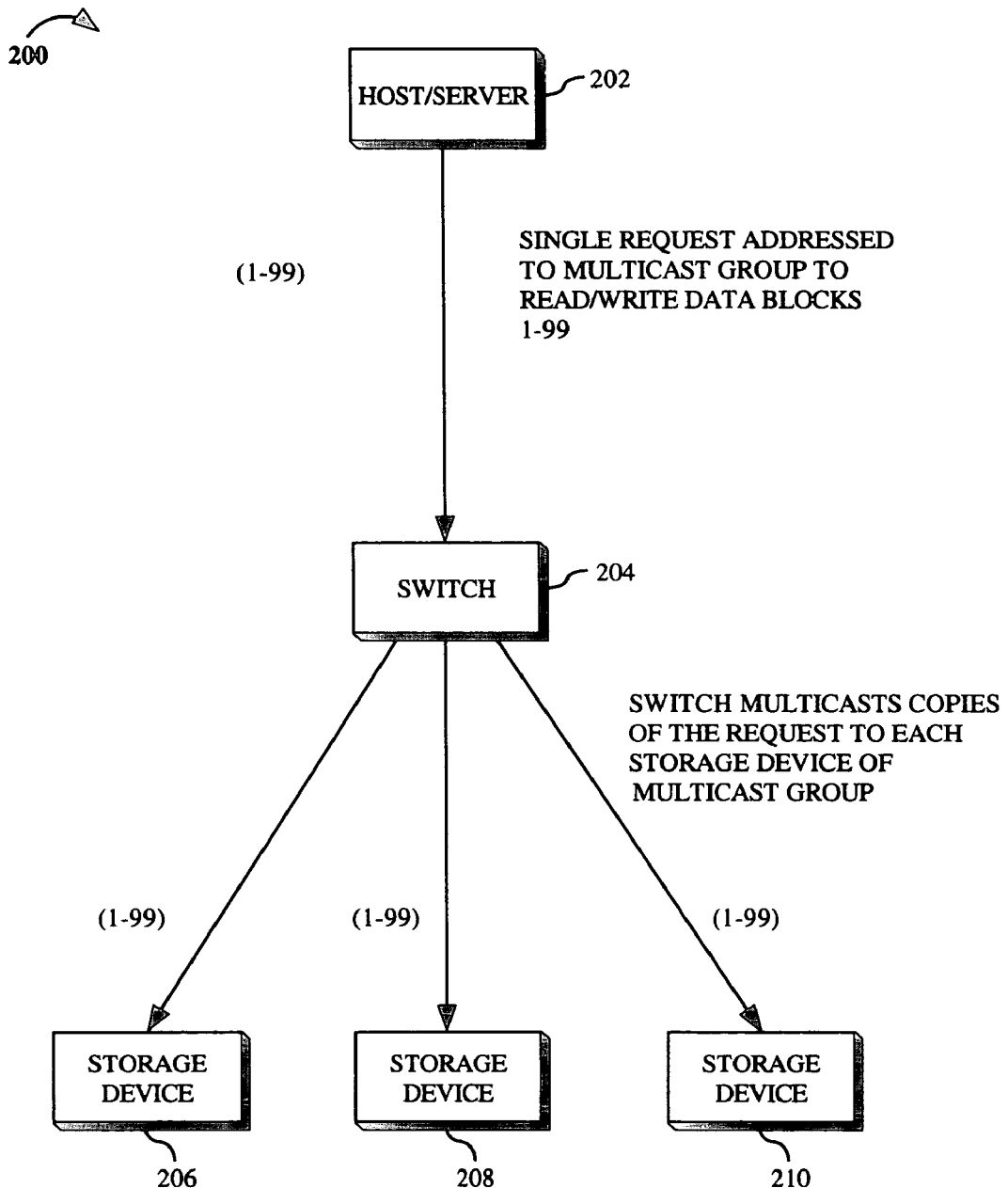
FIG. 2 is an illustration of a system for fabric storage utilizing multicast with distributed intelligence in accordance with an exemplary embodiment of the present invention.

In FIG. 2, the host/server 202 issues a single request addressed to a multicast group, the multicast group including storage devices 206, 208 and 210. In exemplary embodiments, the request may be a read request, a write request or the like. In the present embodiment, the switch 204 receives the request from the host/server 202 and recognizes that the request is addressed to a multicast group. The switch 204 then utilizes its multicast functionality to duplicate the request and to send a copy of the request to each storage device (206, 208 and 210) of the multicast group.

Figure 3:
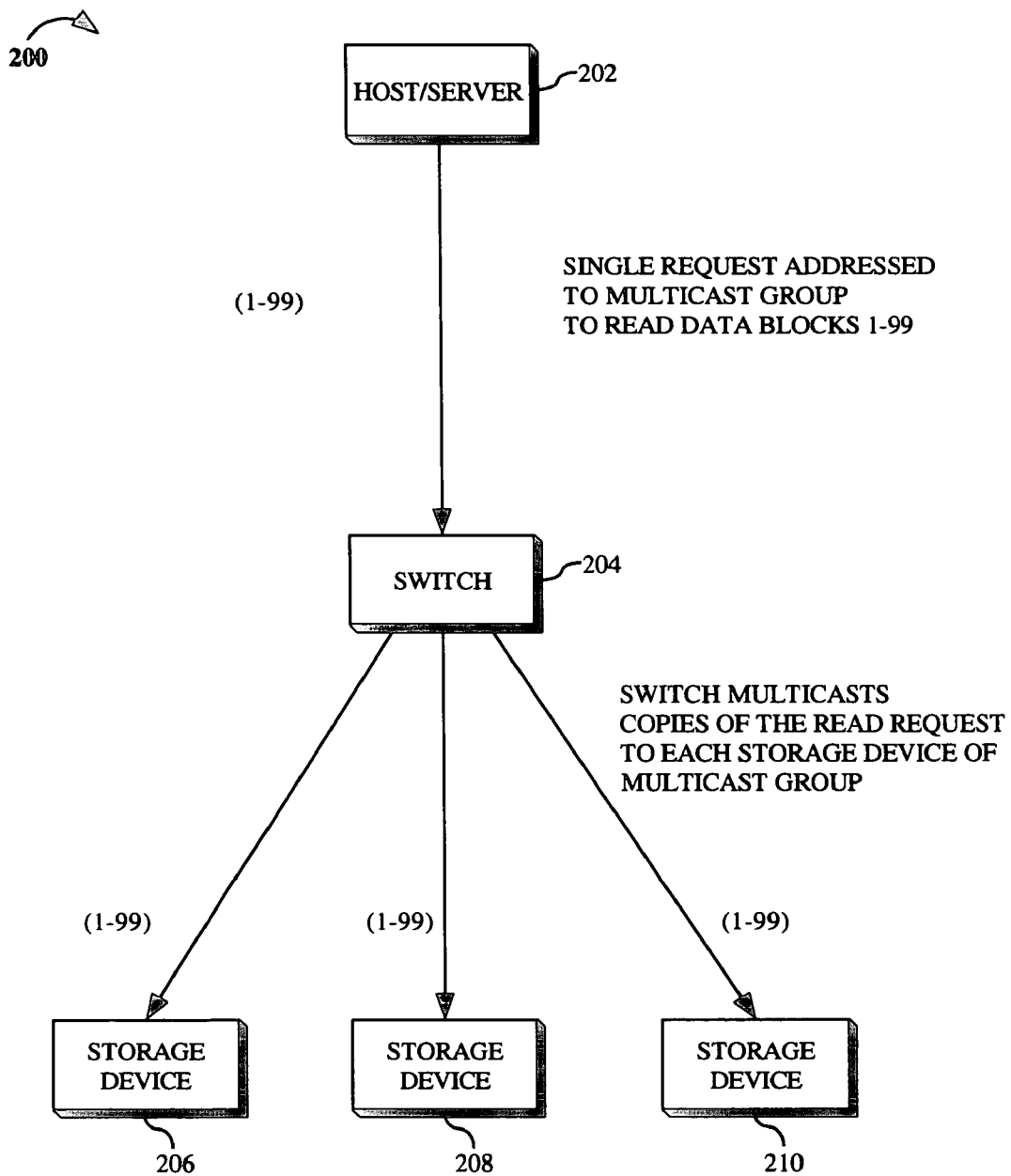
FIG. 3 is an illustration of a system for fabric storage utilizing multicast with distributed intelligence in accordance with an exemplary embodiment of the present invention.
Figure 4:
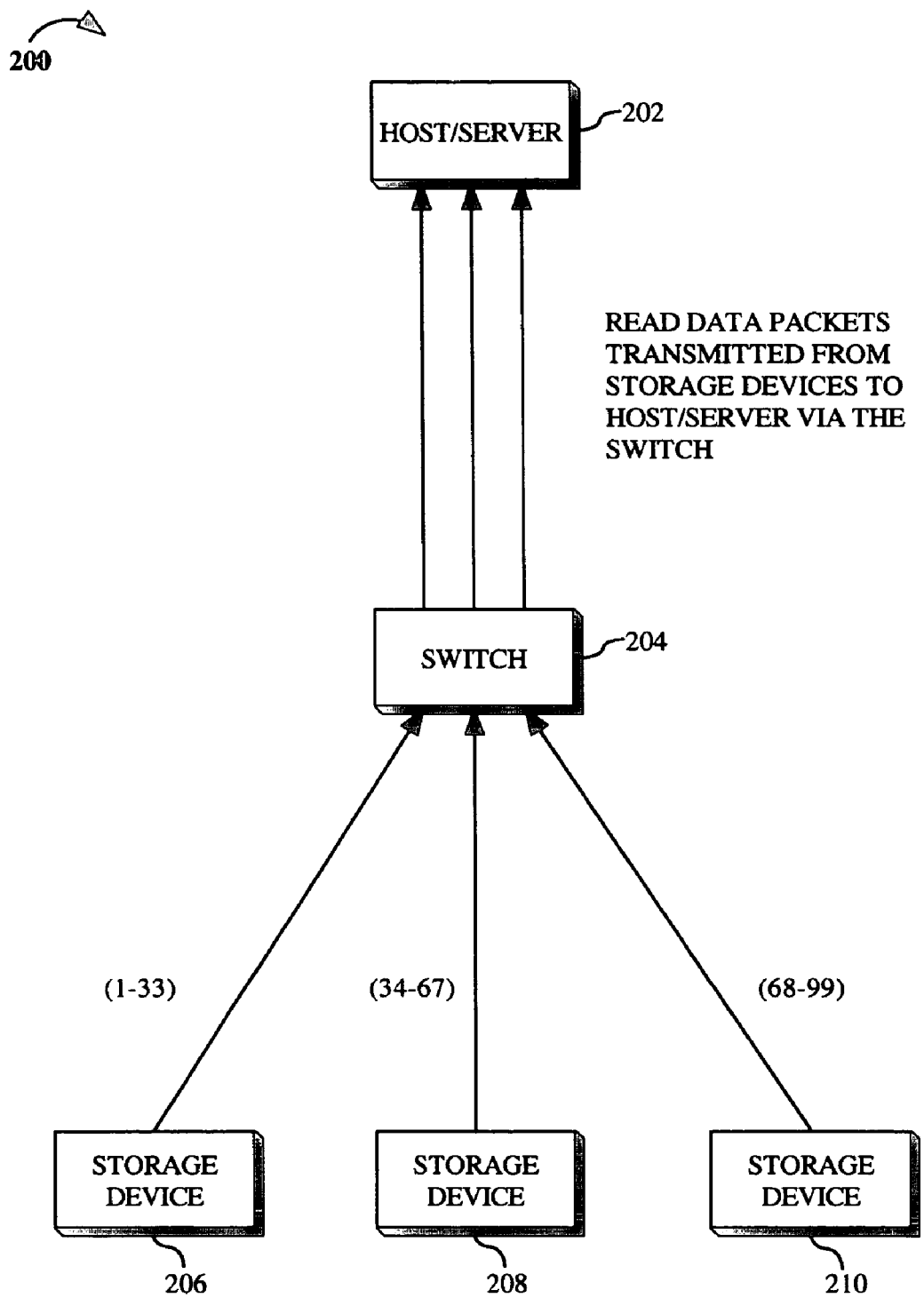
FIG. 4 is an illustration of a system for fabric storage utilizing multicast with distributed intelligence in accordance with an exemplary embodiment of the present invention.

In the embodiments shown in FIGS. 3 and 4, the request issued by the host/server 202 is a read request and the system 200 is implementing striping, so that a number of data blocks, such as data blocks 1-99 are stored or "striped" across the plurality of storage devices (206, 208 and 210). For example, a first storage device 206 stores data blocks 1-33, while a second storage device 208 stores data blocks 34-67 and a third storage device 210 stores data blocks 68-99. In FIG. 3, the host/server 202 issues a read request addressed to the multicast group (i.e., storage devices 206, 208 and 210) asking for data blocks 1-99. The switch 204, receives the read request and recognizes that it is addressed to the multicast group. The switch 204, utilizing its multicast functionality, then duplicates the request and sends the same request (i.e., a request asking for data blocks 1-99) to each storage device (206, 208 and 210) within the multicast group.

In current embodiments, each storage device (206, 208 and 210) is configured with an intelligence (i.e., mapping functionality), which allows each storage device to determine whether it has data blocks stored within a requested range. For example, upon receiving its respective copy of the read request asking for data blocks 1-99, the first storage device 206 recognizes that it stores data blocks within the requested range of 1-99 (i.e., data blocks 1-33). Likewise, the second and third storage devices (208 and 210) recognize that they store data blocks 34-67 and 68-99 respectively, which fall within the requested range of 1-99. It is contemplated that there are well known methods for configuring devices with the above-described mapping functionality. Each storage device, as shown in FIG. 4, then proceeds to generate and send an independent response (in the form of a Read Data packet) which provides requested data blocks to the host/server 202, via the switch 204. In exemplary embodiments, the host/server 202 is configured to associate each Read Data packet received with the request which prompted its transmittal.

Figure 5:
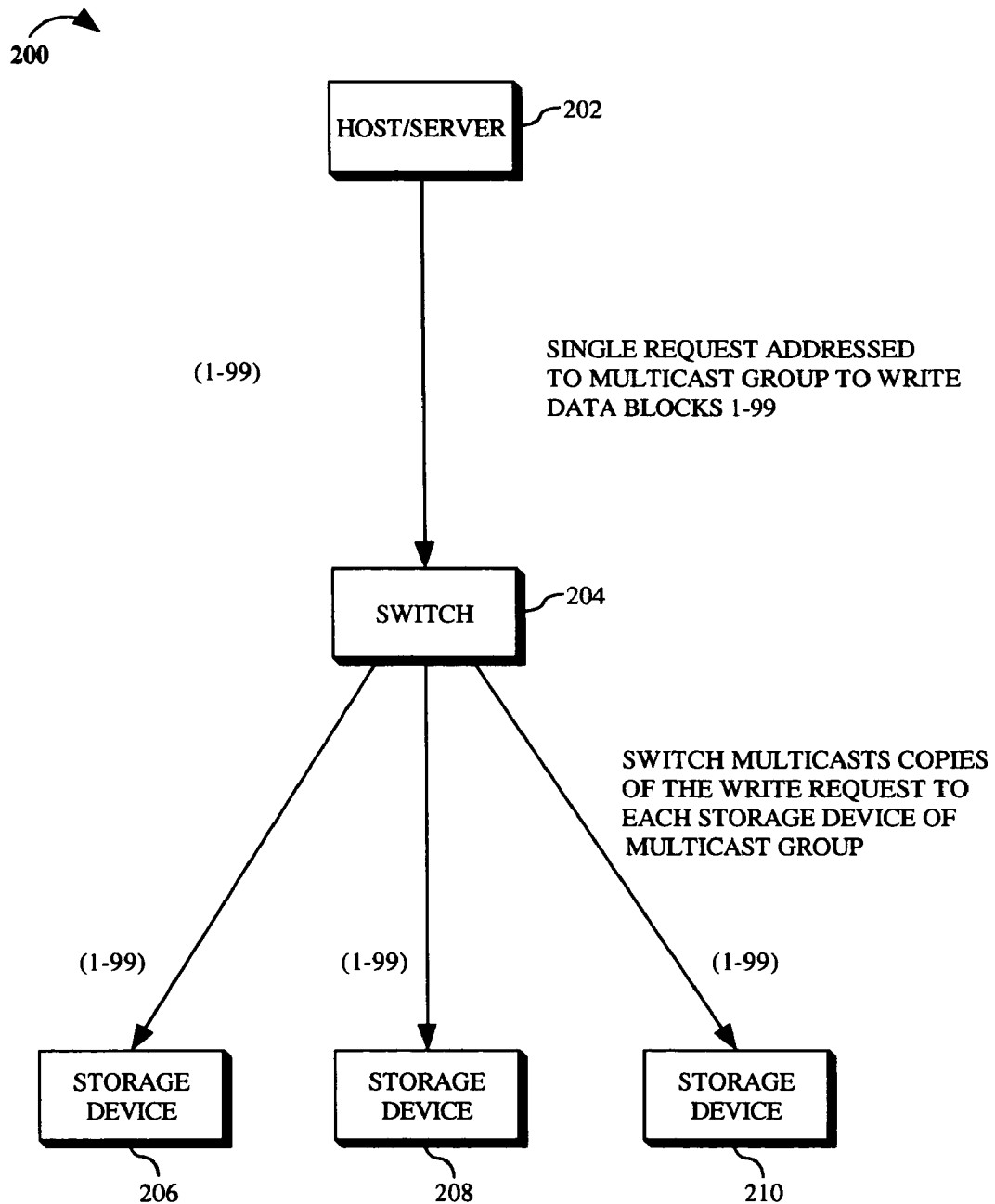
FIG. 5 is an illustration of a system for fabric storage utilizing multicast with distributed intelligence in accordance with an exemplary embodiment of the present invention.
Figure 6:
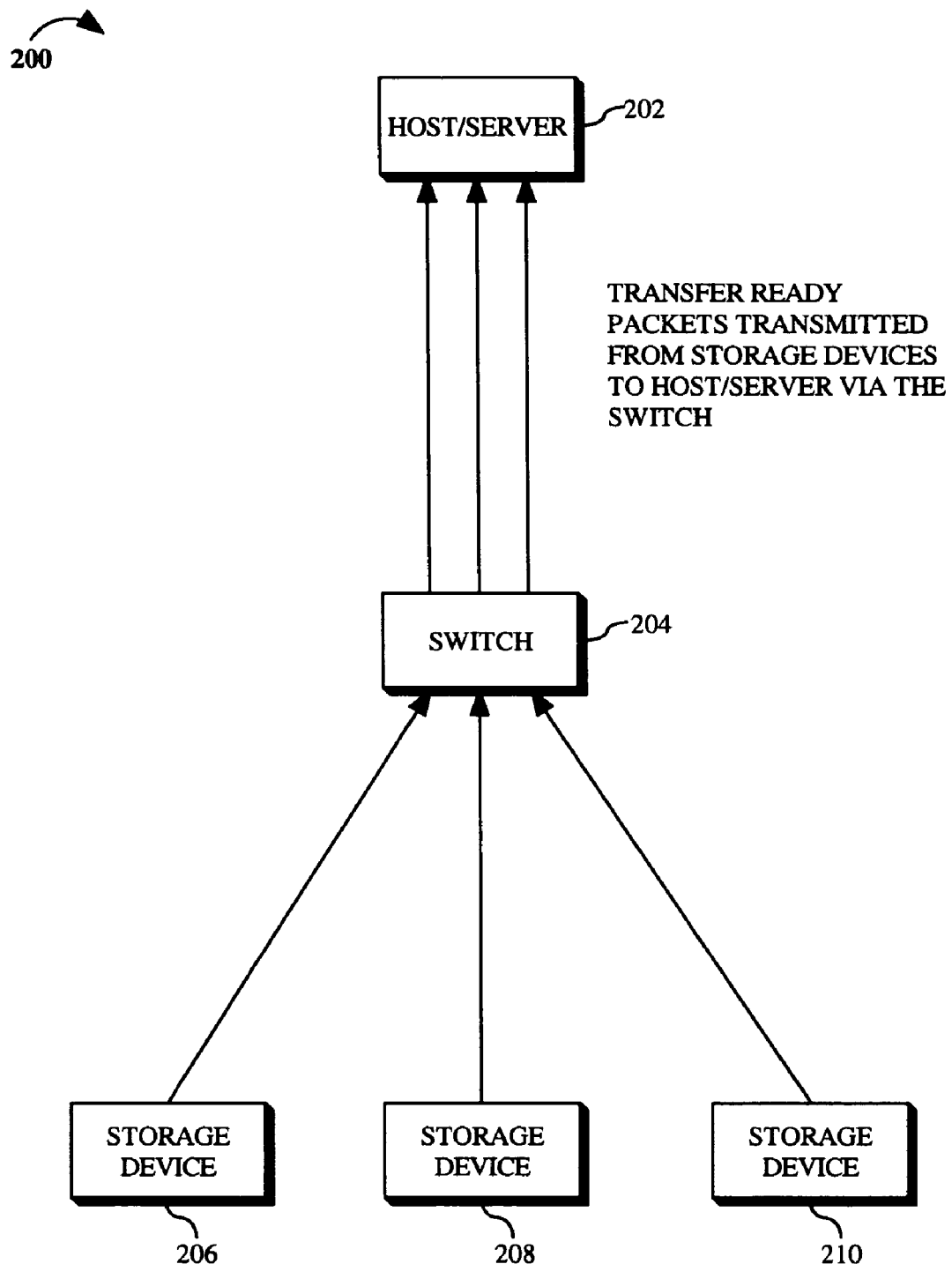
FIG. 6 is an illustration of a system for fabric storage utilizing multicast with distributed intelligence in accordance with an exemplary embodiment of the present invention.
Figure 7:
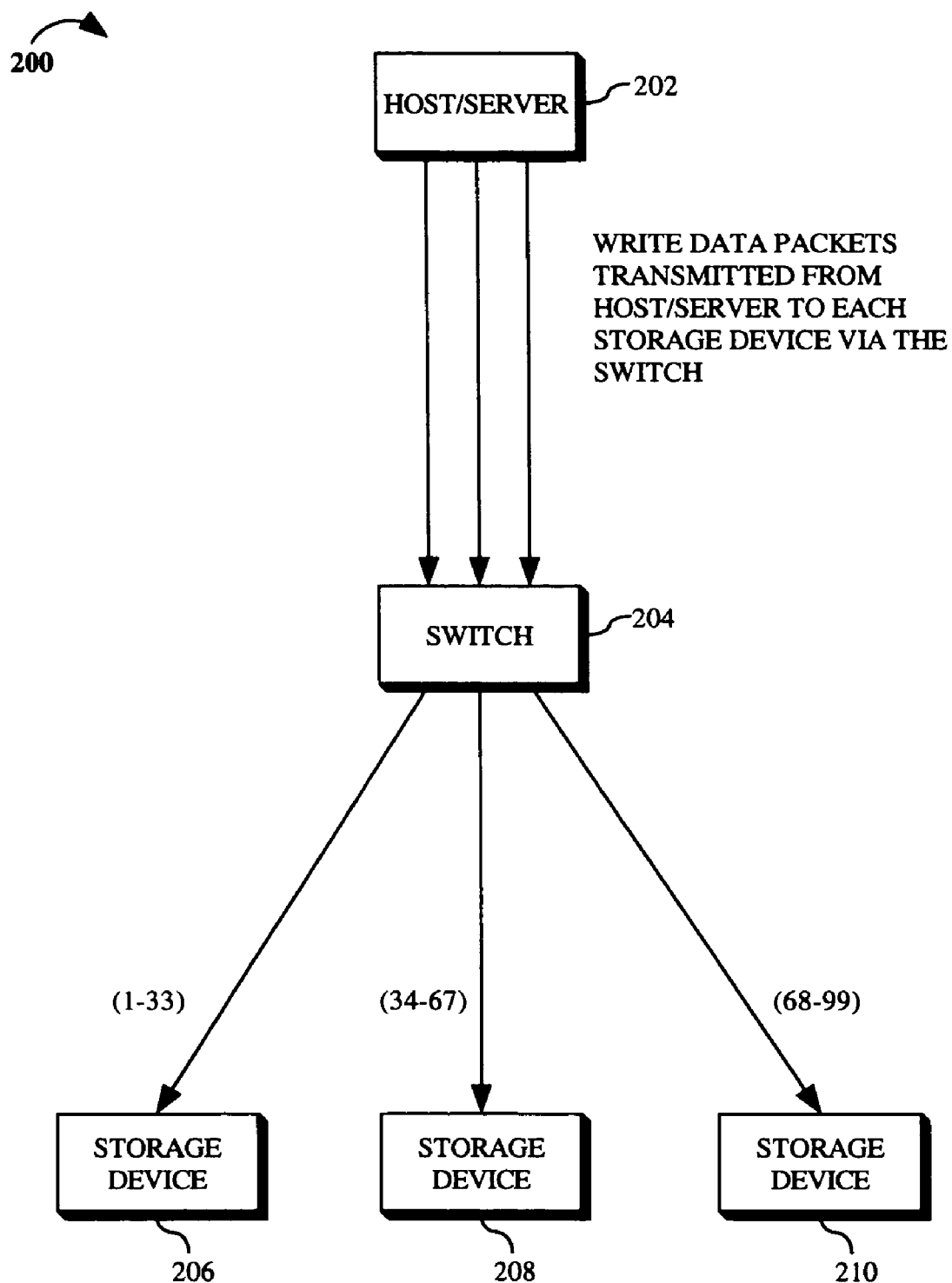
FIG. 7 is an illustration of a system for fabric storage utilizing multicast with distributed intelligence in accordance with an exemplary embodiment of the present invention.

In the embodiments shown in FIGS. 5-7, the request issued by the host/server 202 is a write request to each of the storage devices (206, 208 and 210) of the multicast group. Further, the system 200 is implementing striping, so that a number of data blocks, such as data blocks 1-99 are allocated to be stored or "striped" across the plurality of storage devices (206, 208 and 210). For example, a first storage device 206 is allocated to store data blocks 1-33, while a second storage device 208 is allocated to store data blocks 34-67 and a third storage device 210 is allocated to store data blocks 68-99. In FIG. 5, the host/server 202 issues a write request addressed to the multicast group (i.e., storage devices 206, 208 and 210) requesting that data blocks 1-99 be written to the storage devices. The switch 204, receives the write request and recognizes that it is addressed to the multicast group. The switch 204, utilizing its multicast functionality, then duplicates the request and sends the same request (i.e.-a request asking to write data blocks 1-99) to each storage device (206, 208 and 210) within the multicast group.

In current embodiments, each storage device (206, 208 and 210) is configured with an intelligence (i.e., mapping functionality), which allows each storage device to determine whether it is allocated to store data blocks within a requested range. It is contemplated that there are well known methods for configuring devices with the above-described mapping functionality. For example, upon receiving its respective copy of the write request asking to write data blocks 1-99, the first storage device 206 recognizes that it is allocated to store data blocks within the requested range of 1-99 (i.e., data blocks 1-33). Likewise, the second and third storage devices (208 and 210) recognize that they are allocated to store data blocks 34-67 and 68-99 respectively, which fall within the requested range of 1-99. Each storage device, as shown in FIG. 6, then proceeds to generate and send an independent response (in the form of a Transfer Ready packet) to the host/server 202, via the switch 204, which notifies the host/server 202 that the storage device is allocated to store data blocks within the requested range. Further, each Transfer Ready packet includes information which allows the host/server 202 to determine which storage device (206, 208 or 210) data blocks within the requested range are to be written to. In exemplary embodiments, the host/server 202 is configured to associate each Transfer Ready packet received with the request which prompted its transmittal. Utilizing the information in the Transfer Ready packets, the host/server is able to write the data blocks to their allocated storage devices (206, 208 and 210) via unicast transmissions to each of the storage devices as shown in FIG. 7.

Figure 8:
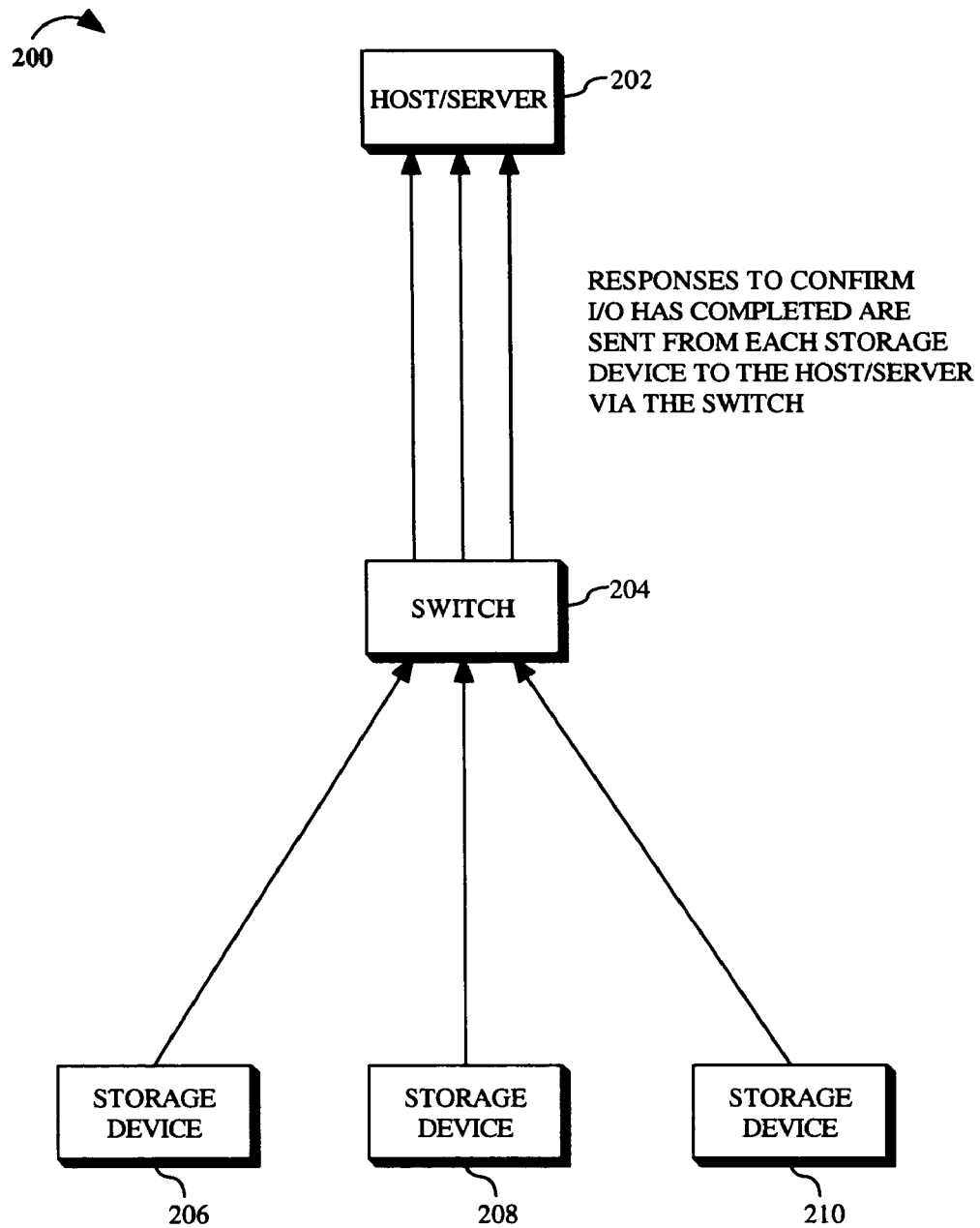
FIG. 8 is an illustration of a system for fabric storage utilizing multicast with distributed intelligence in accordance with an exemplary embodiment of the present invention.

Upon completion of a read/write operation, the system 200 of the present invention provides that each storage device (206, 208 and 210) generate an independent confirmation response, as shown in FIG. 8, to notify the host/server 202 that a read from or write to the corresponding storage device has completed successfully. In the exemplary embodiment, the host/server 202 is configured with the ability to coordinate each independent confirmation response with the corresponding request or I/O which prompted its transmittal.

The system 200 for fabric storage of the present invention is advantageous because the switch 204, upon receiving a read or write request from the host/server 202, only needs to duplicate and send the same request via its multicast functionality to each storage device (206, 208 and 210). Because each storage device (206, 208 and 210) is configured with mapping functionality (i.e., intelligence), each storage device is able to determine its storage layout. For instance, each storage device is able to determine if it is storing (or is allocated to store) any data blocks within a requested range and then is further able to respond to the request. The mapping functionality further allows each storage device (206, 208 and 210) to be aware of its presence and relative place within a multicast group. The system of the present invention, because it distributes the intelligence to the storage devices (206, 208 and 210), reduces the required intelligence of the switch 204. This is advantageous because it may result in faster delivery of the requests to the storage devices (206, 208 and 210), in comparison with "intelligent" switches, which spend time processing the request, determining which storage devices are storing (or are allocated to store) the desired information, and generating specifically-tailored requests to those storage devices.

Figure 9:
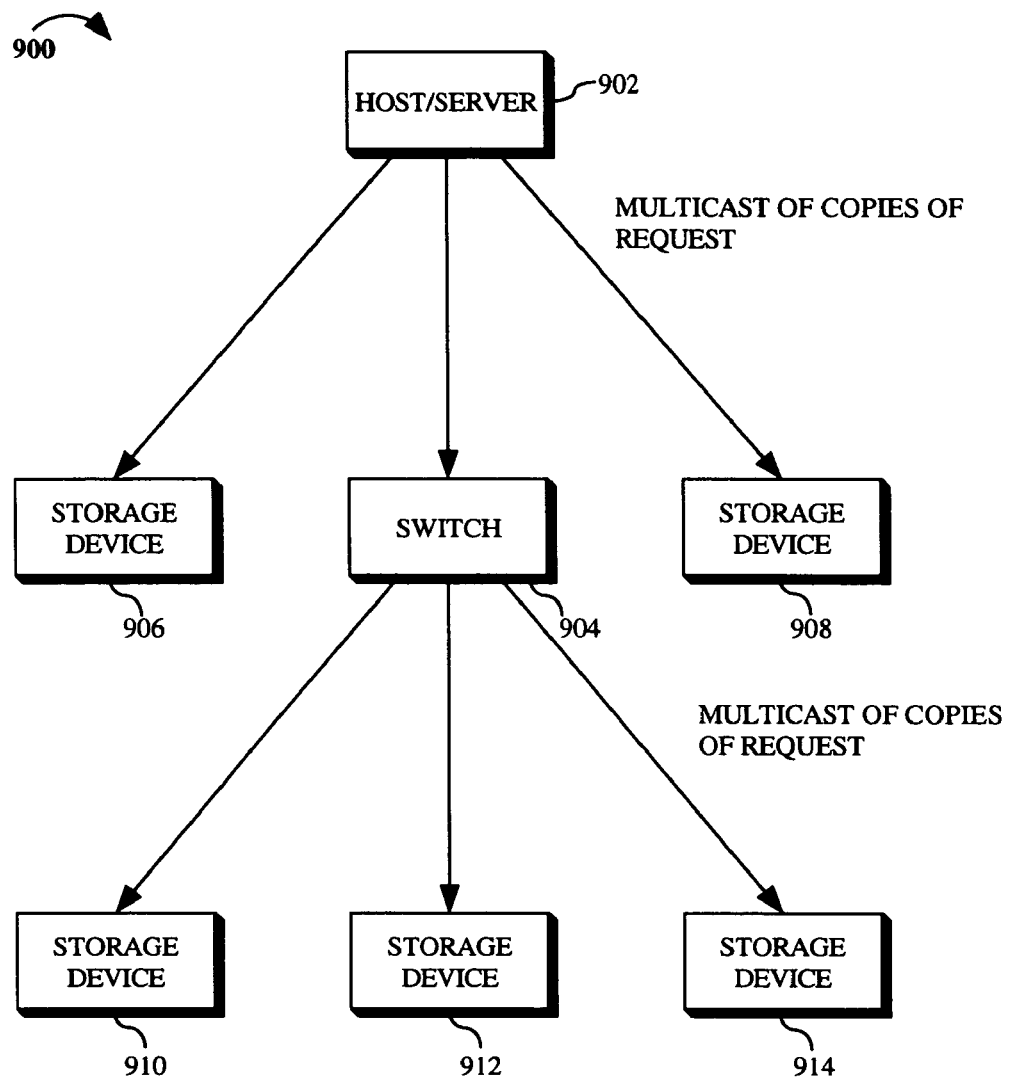
FIG. 9 is an illustration of a system for fabric storage utilizing multicast with distributed intelligence in accordance with an alternative embodiment of the present invention.

FIG. 9 illustrates a system for fabric storage utilizing multicast in accordance with an embodiment of the present invention. In the illustrated embodiment, the system 900 includes an initiator device, such as a host/server 902. The system 900 further includes a switch 904, and a plurality of multicast group devices, such as storage devices (906, 908, 910, 912 and 914), all communicatively connected over a network, such as a Storage Area Network (SAN), or the like. In the present embodiment, the host/server 902 is configured with multicast functionality. It is contemplated that various methods known to those of skill in the art may be implemented to configure the host/server 902 with multicast functionality. Implementing multicast functionality within the host/server 902 may further allow for trunking multiple host connections together to increase bandwidth on a given I/O.

In the embodiment illustrated in FIG. 9, the host/server 902 issues a request, such as a read or write request, addressed to every member storage device (906, 908, 910, 912 and 914) within a multicast group. In the exemplary embodiment, the multicast group includes five storage devices (906, 908, 910, 912 and 914). The host/server 902 multicasts copies of the request to storage devices 906 and 908 of the multicast group, and also to the switch 904. In the exemplary embodiment, the switch 904 is also enabled with multicast functionality, thus allowing the switch 904 to receive a copy of the request and multicast additional copies of the request to storage devices 910, 912 and 914 of the multicast group.

In the exemplary embodiment, each of the storage devices (906, 908, 910, 912 and 914), upon receiving a copy of the request, are configured with mapping functionality (i.e., intelligence) which allows each storage device to determine what specific blocks of data it stores (or is allocated to store), thus determining its place within the multicast group. As previously discussed above, this may be useful, particularly in systems implementing striping.

Figure 10:
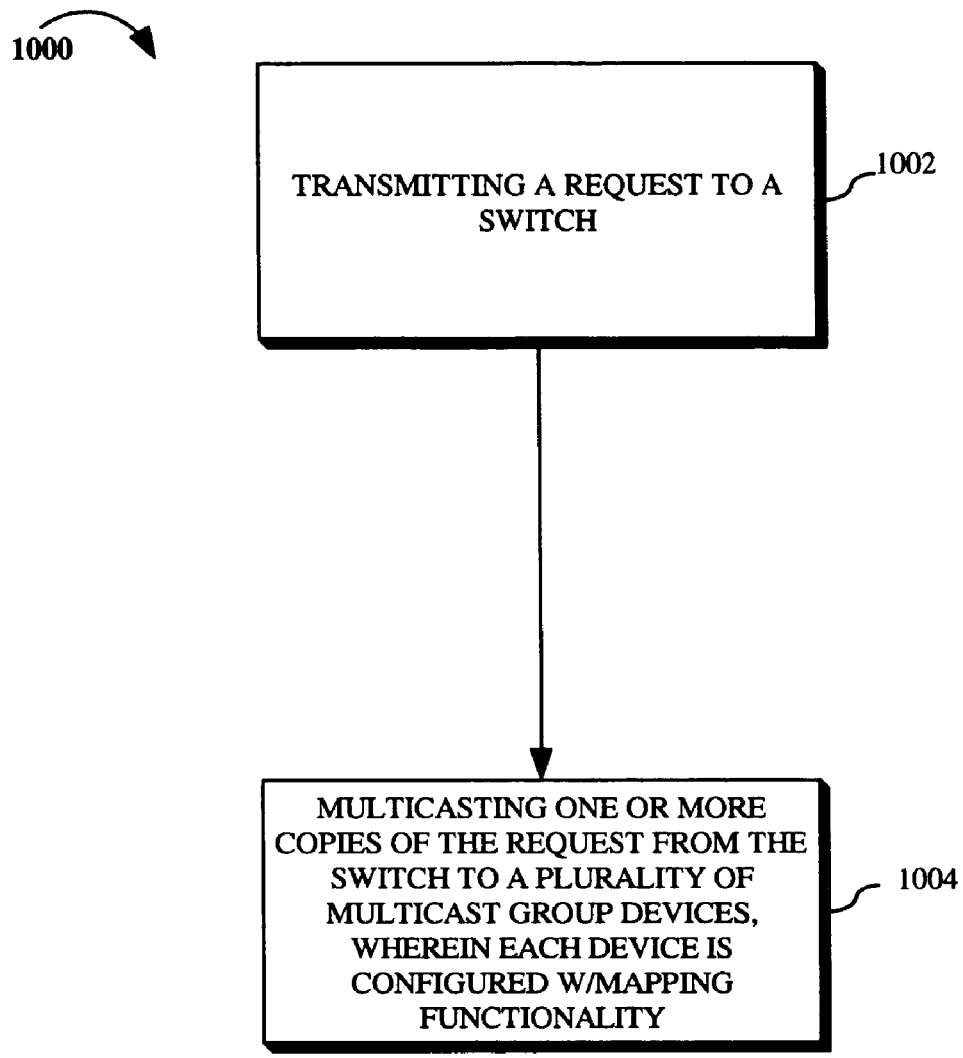
FIG. 10 is a flowchart illustrating a method for fabric storage utilizing multicast with distributed intelligence in accordance with an exemplary embodiment of a present invention.

FIG. 10 is a flowchart illustrating a method for fabric storage utilizing multicast with distributed intelligence in accordance with an embodiment of the present invention. The method 1000 includes the steps of transmitting a request to a switch 1002. The method further includes the step of multicasting one or more copies of the request from the switch to a plurality of multicast group devices 1004, wherein each device of the plurality of multicast group devices is configured with a mapping functionality for determining its respective storage layout.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system utilizing multicast with distributed intelligence, comprising:

an initiator device, the initiator device being a host device, the initiator device being configured for transmitting an Input/Output (I/O) request, the I/O request from the host device being addressed to a multicast group;

a switch, the switch being configured for being communicatively coupled to the initiator device and for receiving the transmitted request from the initiator device, the switch being further configured with multicast functionality for multicasting a plurality of copies of the host device I/O request to the multicast group; and a plurality of multicast group devices, the plurality of multicast group devices being storage devices, the plurality of multicast group devices being communicatively coupled to the host via the switch, each multicast group device included in the plurality of multicast group devices belonging to the multicast group, a first multicast group device included in the plurality of multicast group devices being configured for receiving a first copy of the request included in the plurality of copies of the request from the initiator device, via the switch, the first multicast group device being further configured with mapping functionality, said mapping functionality allowing the first multicast group device to determine a storage layout of the first multicast group device, said mapping functionality further allowing the first multicast device to compare the storage layout of the first multicast group device with the received first copy of the request, a second multicast group device included in the plurality of multicast group devices being configured for receiving a second copy of the request included in the plurality of copies of the request from the initiator device, via the switch, the second multicast group device being further configured with mapping functionality, said mapping functionality of the second multicast group device allowing the second multicast group device to determine a storage layout of the second multicast group device, said mapping functionality further allowing the second multicast group device to compare the storage layout of the second multicast group device with the received second copy of the request and;

when said host device I/O request is a read request, said read request requesting a first portion of data and a second portion of data, and when said comparison provided by the first multicast device indicates that the first multicast device includes the first portion of data requested in said read request, but not the second portion of data requested in said read request, and when said comparison provided by the second multicast device indicates that the second multicast device includes the second portion of the data requested in said read request, but not the first portion of data requested in said read request, said first multicast device is further configured for transmitting said first portion of data requested in said read request to the host device, and said second multicast device is further configured for transmitting said second portion of data requested in said read request to the host device, wherein the initiator device, switch and each multicast group device of the plurality of multicast group devices are communicatively coupled via a network.

2. The system as claimed in claim 1, wherein the request is one of a read request or a write request.

3. The system as claimed in claim 1, wherein the initiator device is configured with multicast functionality.

4. A method for fabric storage utilizing multicast with distributed intelligence, comprising:
transmitting an I/O request from a host device to a switch; and
multicasting a plurality of copies of the host I/O request from the switch to a plurality of multicast group devices, the plurality of multicast group devices being storage devices;
receiving a first copy of the host I/O request included in the plurality of copies of the host I/O request at a first multicast group device included in the plurality of multicast group devices;
receiving a second copy of the host I/O request included in the plurality of copies of the host I/O request at a second multicast group device included in the plurality of multicast group devices, wherein said first multicast group device is configured with a mapping functionality for allowing the first multicast group device to determine a storage layout of the first multicast group device, said mapping functionality further allowing said first multicast group device to compare the storage layout of the first multicast group device with the received first copy of the request, said second multicast group device being configured with mapping functionality for allowing the second multicast group device to determine a storage layout of the second multicast group device, said mapping functionality further allowing said second multicast group device to compare the storage layout of the second multicast group device with the received second copy of the request and;

when said host I/O request is a read request requesting a first portion of data and a second portion of data, and when said comparison provided by the first multicast device indicates that the first multicast device includes the first portion of data requested in said read request, but not the second portion of data, and when said comparison provided by the second multicast device indicates that the second multicast device includes the second portion of data requested in said read request, but not the first portion of data, said first multicast device is further configured for transmitting said first portion of the requested data to the host device and said second multicast device is further configured for transmitting said second portion of the requested data to the host device.

5. The method as claimed in claim 4, wherein the request is one of a read request or a write request.

6. The method as claimed in claim 4, wherein the host device is configured with multicast functionality.

7. The method as claimed in claim 4, wherein the host device has the ability to determine from which storage device a response to a write request is being sent.

8. The method as claimed in claim 4, wherein the host device has the ability to determine from which storage device a response to a read request is being sent.

9. A non-transitory computer-readable medium having computer-executable instructions for performing a method for providing a network with fabric storage utilizing multicast with distributed intelligence, said method comprising steps of:
receiving a first copy of a multicast request included in a plurality of copies of a multicast request at a first multicast group device included in a plurality of multicast group devices, the plurality of multicast group devices being storage devices;
receiving a second copy of the host I/O request included in the plurality of copies of the host I/O request at a second multicast group device included in the plurality of multicast group devices, wherein said first multicast group device is configured with a mapping functionality for allowing the first multicast group device to determine a storage layout of the first multicast group device, said mapping functionality further allowing said first multicast group device to compare the storage layout of the first multicast group device with the received first copy of the request, said second multicast group device being configured with mapping functionality for allowing the second multicast group device to determine a storage layout of the second multicast group device, said mapping functionality further allowing said second multicast group device to compare the storage layout of the second multicast group device with the received second copy of the request; and when said request is a read request and when said comparison provided by the first multicast device indicates that the first multicast device includes a first portion of data requested in said read request but not a second portion of data requested in said read request, and when said comparison provided by the second multicast device indicates that the second multicast device includes the second portion of data requested in said read request, but not the first portion of data, said first multicast device is further configured for transmitting said first portion of the requested data to a host device for the request via a switch, and said second multicast device is further configured for transmitting said second portion of the requested data to the host device for the request via the switch, wherein said switch and host device are communicatively coupled with the plurality of multicast group devices via a network.

10. The non-transitory computer-readable medium as claimed in claim 9, wherein a host device transmits the request to the switch.

11. The non-transitory computer-readable medium as claimed in claim 9, wherein the request is one of a read request or a write request.

12. The non-transitory computer-readable medium as claimed in claim 10, wherein the host device is configured with multicast functionality.

13. The non-transitory computer-readable medium as claimed in claim 10, wherein said method further comprises allowing the host to determine from which storage device a response to a write request is being sent.

14. The non-transitory computer-readable medium as claimed in claim 10, wherein said method further comprises allowing the host to determine from which storage device a response to a read request is being sent.

* * * * *